US011915630B2

(12) United States Patent
Lim

(10) Patent No.: US 11,915,630 B2
(45) Date of Patent: Feb. 27, 2024

(54) DISPLAY APPARATUS AND CONTROL METHOD THEREOF

(71) Applicant: SAMSUNG ELECTRONICS CO., LTD., Suwon-si (KR)

(72) Inventor: Sungjin Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/197,971

(22) Filed: May 16, 2023

(65) Prior Publication Data

US 2024/0029602 A1 Jan. 25, 2024

Related U.S. Application Data

(63) Continuation of application No. PCT/KR2023/006121, filed on May 4, 2023.

(30) Foreign Application Priority Data

Jul. 20, 2022 (KR) ........................ 10-2022-0089888

(51) Int. Cl.

*G09G 3/00* (2006.01)
*G09G 3/3233* (2016.01)
*G09G 3/20* (2006.01)

(52) U.S. Cl.

CPC ........... *G09G 3/006* (2013.01); *G09G 3/2096* (2013.01); *G09G 3/3233* (2013.01); *G09G 2300/0842* (2013.01); *G09G 2310/0264* (2013.01); *G09G 2330/027* (2013.01); *G09G 2330/12* (2013.01)

(58) Field of Classification Search

CPC .... G09G 3/006; G09G 3/2096; G09G 3/3233; G09G 2300/0842; G09G 2310/0264; G09G 2330/027; G09G 2330/12
See application file for complete search history.

(56) References Cited

U.S. PATENT DOCUMENTS 10,998,934 B2 5/2021 Yoshida
11,069,267 B2 7/2021 Nakano
11,232,725 B2 1/2022 Kim
11,327,371 B2 5/2022 Fujita et al.
(Continued)

FOREIGN PATENT DOCUMENTS

JP 2020-24316 A 2/2020
JP 2021-1943 A 1/2021
(Continued)

*Primary Examiner* — Abhishek Sarma
(74) *Attorney, Agent, or Firm* — Sughrue Mion, PLLC

(57) ABSTRACT

A display apparatus includes: a display panel including a first region and a second region; a controller to process source data and to generate an image signal; a timing controller to generate a driving signal for driving the display panel based on the image signal; and a cable connected to the display panel and to transmit the driving signal to the display panel. The controller transmits, to the timing controller, a pattern image signal for displaying a pattern image on the first and the second regions in a sequential manner; and determines a connection state of the cable based on (i) a first current value, which is output based on the pattern image displayed in the first region and (ii) a second current value, which is output based on the pattern image displayed in the second region.

20 Claims, 10 Drawing Sheets

(56) References Cited

U.S. PATENT DOCUMENTS

| | | | | |
|---|---|---|---|---|
| 2019/0197931 | A1* | 6/2019 | Kim ................. | G01R 31/31701 |
| 2020/0400993 | A1 | 12/2020 | Fujita et al. | |

FOREIGN PATENT DOCUMENTS

| | | | |
|---|---|---|---|
| KR | 10-1182148 | B1 | 9/2012 |
| KR | 10-2018-0005866 | A | 1/2018 |
| KR | 10-2019-0079739 | A | 7/2019 |
| KR | 10-2021-0033732 | A | 3/2021 |
| KR | 10-2381120 | B1 | 4/2022 |

* cited by examiner

FIG. 10

100

1000

| | MEASURED VALUE OF FIRST REGION | MEASURED VALUE OF SECOND REGION | DIFFERENCE | CONNECTION STATE OF CABLE |
|---|---|---|---|---|
| FIRST PATTERN IMAGE | 10.1W | 10.1W | 0 | NORMAL |
| SECOND PATTERN IMAGE | 10W | 11W | 1W | DEFECT |

DISPLAY APPARATUS AND CONTROL METHOD THEREOF

CROSS-REFERENCE TO RELATED APPLICATION(S)

This application is a continuation application, under 35 U.S.C. § 111(a), of international application No. PCT/KR2023/006121, filed on May 4, 2023, which claims priority to Korean Patent Application No. 10-2022-0089888, filed on Jul. 20, 2022, in the Korean Intellectual Property Office, the disclosure of which is incorporated by reference herein in its entirety

BACKGROUND

1. Field

The disclosure relates to a display apparatus capable of detecting a connection defect between a display panel and a cable connected to the display panel, and a control method thereof.

2. Description of Related Art

The display apparatus includes a display panel, and is configured to display an image by adjusting an amount of light emitted from pixels of the display panel. The display panel may be classified into a self-luminous display panel that emits light by itself according to an image, and a non-self-luminous display panel that blocks or passes light emitted from a separate light source according to an image. An example of the non-self-luminous display panel is a liquid crystal display (LCD) panel.

A liquid crystal display (LCD) is a representative non-self-luminous display, including a backlight unit that supplies light from the rear of a display panel, a liquid crystal layer that acts as a switch to pass/block light, and a color filter that changes the supplied light to the desired color. Therefore, the LCD has a complex structure and has a limit in implementing a small thickness.

On the other hand, the self-luminous display, in which a light emitting diode (LED) is provided for a pixel and the pixel emits light by itself, does not require components such as a backlight unit and a liquid crystal layer and excludes a color filter. Accordingly, the self-luminous display may have a simple structure and a high degree of design freedom. In addition, it may be possible to implement a small thickness, as well as to implement an excellent contrast ratio, brightness and viewing angle.

In the related art, for a defect test of a self-luminous display apparatus, it is checked whether there is a dot on a screen while a white image, a red image, a green image, or a blue image is displayed on the entire screen. However, the test method in the related art has a difficulty in that it may be not capable of detecting other defects such as a connection defect of a cable connected to a display panel.

SUMMARY

Provided are a display apparatus capable of detecting a connection defect between a self-luminous display panel and a cable connected to the self-luminous display panel, and a control method thereof.

Additional aspects of the disclosure will be set forth in part in the description which follows and, in part, will be obvious from the description, or may be learned by practice of the disclosure.

In accordance with an aspect of the disclosure, a display apparatus includes: a display panel including a first region and a second region symmetrical to the first region; a main controller configured to process source data and to generate an image signal; a timing controller configured to generate a driving signal for driving the display panel based on the image signal; and a cable connected to the display panel and configured to transmit the driving signal to the display panel. The main controller is configured to: transmit, to the timing controller, a pattern image signal for displaying a pattern image on the first region and the second region in a sequential manner; and determine a connection state of the cable based on (i) a first current value, which is output from the timing controller based on the pattern image displayed in the first region and (ii) a second current value, which is output from the timing controller based on the pattern image displayed in the second region.

In accordance with another aspect of the disclosure, a control method of a display apparatus comprising a display panel and a main controller, the control method includes: transmitting, by the main controller, a pattern image signal for displaying a pattern image on a first region and a second region symmetrical to the first region of the display panel in a sequential manner, to a timing controller; obtaining a first current value output from the timing controller to the display panel based on the pattern image displayed in the first region; obtaining a second current value output from the timing controller to the display panel based on the pattern image displayed in the second region; and determining a connection state of a cable, which is connected to the display panel, based on the first current value and the second current value.

BRIEF DESCRIPTION OF THE DRAWINGS

These and/or other aspects of the disclosure will become apparent and more readily appreciated from the following description of embodiments, taken in conjunction with the accompanying drawings of which:

FIG. 10 illustrates an example in which cable connection state information is displayed on the screen region of the display panel.

DETAILED DESCRIPTION

Figure 1:
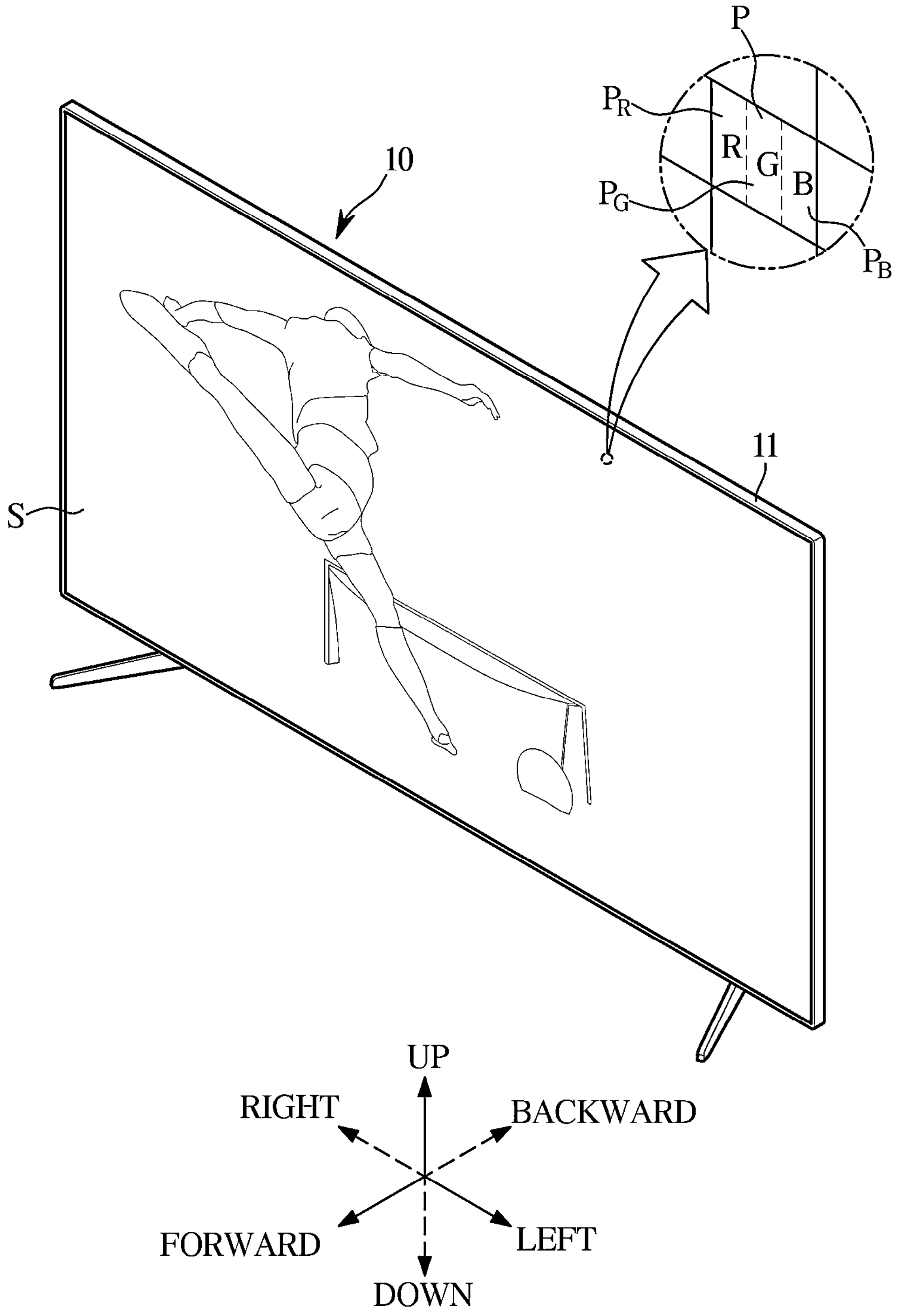
FIG. 1 illustrates an appearance of a display apparatus according to an embodiment.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

Terms such as "unit", "part", "block", "member", and "module" indicate a unit for processing at least one function or operation. For example, those terms may refer to at least one process processed by at least one hardware such as Field Programmable Gate Array (FPGA), Application Specific Integrated Circuit (ASIC), at least one software stored in a memory or a processor.

It will be understood that when an element is referred to as being "connected" another element, it can be directly or indirectly connected to the other element, wherein the indirect connection includes "connection via a wireless communication network". Also, when a part "includes" or "comprises" an element, unless there is a particular description contrary thereto, the part may further include other elements, not excluding the other elements. Throughout the description, when a member is "on" another member, this includes not only when the member is in contact with the other member, but also when there is another member between the two members.

It will be understood that, although the terms first, second, third, etc., may be used herein to describe various elements, but elements are not limited by these terms. The term of "and/or" includes a plurality of combinations of relevant items or any one item among a plurality of relevant items.

An identification code is used for the convenience of the description but is not intended to illustrate the order of each operation. The each operation may be implemented in the order different from the illustrated order unless the context clearly indicates otherwise.

Reference will now be made in detail to embodiments of the disclosure, examples of which are illustrated in the accompanying drawings.

Figure 2:
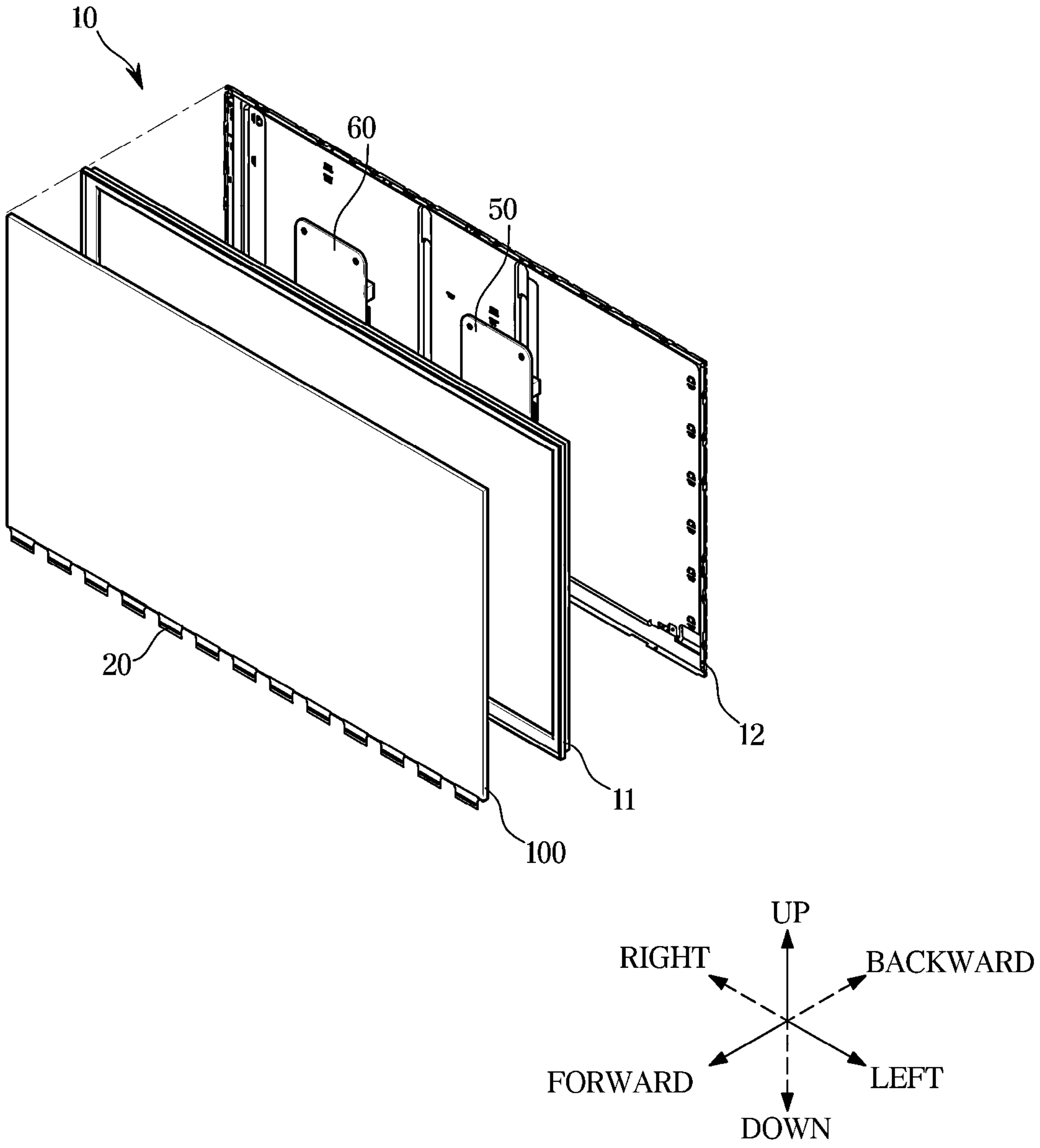
FIG. 2 is an exploded view of the display apparatus according to an embodiment.

FIG. 1 illustrates an appearance of a display apparatus according to an embodiment. FIG. 2 is an exploded view of the display apparatus according to an embodiment.

Referring to FIGS. 1 and 2, a display apparatus 10 may include a frame 11, a rear cover 12 and a display panel 100. The frame 11 may support the display panel 100. The rear cover 12 may be coupled to the frame 11, and may support and fix the frame 11 and the display panel 100. A control board 50 for controlling an operation of the display apparatus 10 and a power board 60 for supplying power to components of the display apparatus 10 may be provided on the rear cover 12.

Various images may be displayed on a screen region S of the display panel 100. For example, a still image or moving image may be displayed on the screen region S of the display panel 100. In addition, a two-dimensional image or a three-dimensional image using the parallax of both eyes of a user may be displayed on the screen region S of the display panel 100.

A plurality of pixels P may be formed on the screen region S of the display panel 100, and an image I displayed on the screen region S may be formed by a combination of light emitted from the plurality of pixels P. The plurality of pixels P may be arranged in a matrix form. That is, the plurality of pixels P may be arranged in a plurality of rows and a plurality of columns. Light emitted by the plurality of pixels P may be combined as a mosaic to form an image. Each of the plurality of pixels P may emit light of various brightness and colors. In order to emit light of various colors, each of the plurality of pixels P may include sub-pixels $P_R$, $P_G$, and $P_B$.

A single pixel P may include a red sub-pixel $P_R$ configured to emit red light, a green sub-pixel $P_G$ configured to emit green light, and a blue sub-pixel $P_B$ configured to emit blue light. By combining the red light from the red sub-pixel $P_R$, the green light from the green sub-pixel $P_G$, and the blue light from the blue sub-pixel $P_B$, the pixel P may emit light having various brightness and various colors.

The arrangement shape of the subpixels $P_R$, $P_G$, and $P_B$ may vary. For example, the red sub-pixel $P_R$, the green sub-pixel $P_G$, and the blue sub-pixel $P_B$ may be arranged in a line, but is not limited thereto. In addition, the size of each of the red sub-pixel $P_R$, the green sub-pixel $P_G$, and the blue sub-pixel $P_B$ may be the same as each other or different from each other.

Alternatively, the unit pixel P is not necessarily composed of a red sub-pixel $P_R$, a green sub-pixel $P_G$, and a blue sub-pixel $P_B$. The pixel P may include a sub-pixel configured to emit yellow light or white light. That is, the color or type of light output from each sub-pixel and the number of sub-pixels may vary depending on the design.

The disclosed display apparatus 10 is a self-luminous display apparatus in which each pixel emits light by itself without a backlight unit. For example, organic light emitting diodes (OLEDs) configured to emit light of different colors may be disposed in each sub-pixel. For example, a red organic light emitting diode may be disposed in the red sub-pixel $P_R$, a green organic light emitting diode may be disposed in the green sub-pixel $P_G$, and a blue organic light emitting diode may be disposed in the blue sub-pixel $P_B$. Accordingly, one sub-pixel may represent one organic light emitting diode. A plurality of pixels including the OLEDs may be independently driven.

A cable 20 may be connected to one side of the display panel 100. The cable 20 may be provided in plurality. The cable 20 may electrically connect the display panel 100 to the control board 50 and the power board 60. The cable 20 may be a flexible flat cable (FFC) and/or a film cable. The display panel 100 may receive a driving signal transmitted from the control board 50 through the cable 20. Further, the display panel 100 may receive power supplied from the power board 60 through the cable 20.

The control board 50 may include a control circuit configured to control the operation of the display apparatus 10. The control circuit may generate an image signal by processing source data received from an external content source and may generate a driving signal for driving the display panel 100. The power board 60 may supply power to components of the display apparatus 10. The power board 60 may be electrically connected to the control board 50 and the display panel 100 and supply power to the control board 50 and the display panel 100, respectively.

The control board 50 and the power board 60 may each include a processor and a memory. One or more processors and memories may be provided. The control board 50 and the power board 60 may be implemented with a printed circuit board and various circuits mounted on the printed circuit board. For example, the control board 50 may include a control circuit board on which a processor and a memory are mounted. The power board 60 may include a power circuit board on which components such as a capacitor, a coil, a resistor, and a processor are mounted.

Figure 3:
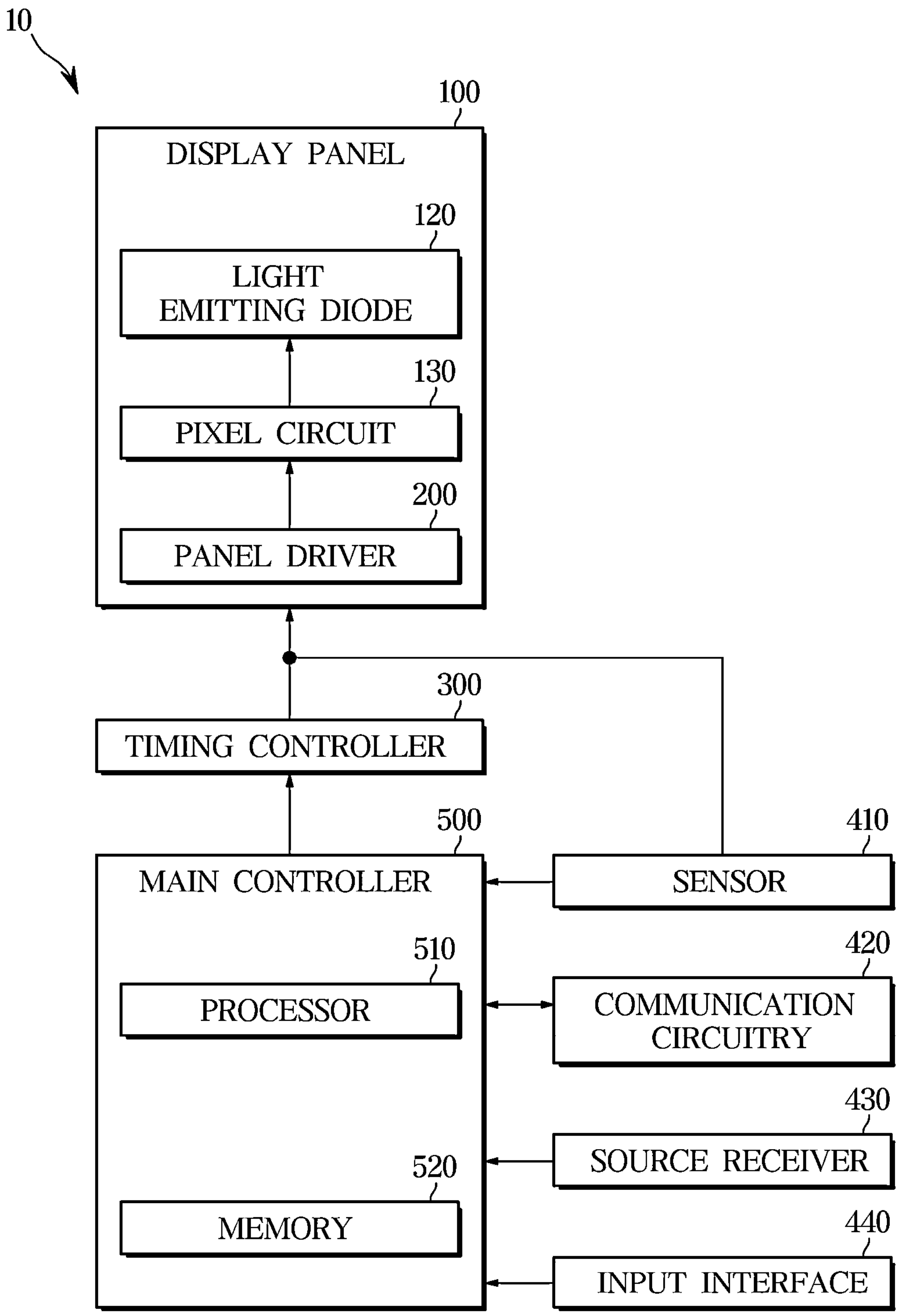
FIG. 3 is a control block diagram of the display apparatus according to an embodiment.

FIG. 3 is a control block diagram of the display apparatus according to an embodiment.

Referring to FIG. 3, the display apparatus 10 may include the display panel 100, a timing controller 300, a sensor 410, a communication circuitry 420, a source receiver 430, an input interface 440, and a main controller 500. The timing controller 300, the sensor 410, the communication circuitry 420, the source receiver 430, the input interface 440, and the main controller 500 may be arranged on the control board 50 described above. Components of the display apparatus 10 may be electrically connected to each other.

The display panel 100 may include a light emitting diode 120, a pixel circuit 130 and a panel driver 200. The display panel 100 may be provided as a self-luminous display panel. That is, the light emitting diode 120 forming the display panel 100 may be an organic light emitting diode. As described above, the display panel 100 may include the plurality of pixels P, and each pixel may include the plurality of sub-pixels $P_R$, $P_G$, and $P_B$. The light emitting diode 120 may be disposed in the sub-pixel.

The pixel circuit 130 may output a driving current for driving the light emitting diode 120. The panel driver 200 may include a scan driver 210 configured to apply a gate voltage to the pixel circuit 130 and a data driver 220 configured to apply a data voltage to the pixel circuit 130. The pixel circuit 130 may be connected to the panel driver 200 and output a driving current for driving the light emitting diode 120 based on application of a gate voltage and a data voltage. The driving current output from the pixel circuit 130 may be applied to the light emitting diode 120, and the light emitting diode 120 may emit light by the applied driving current. The plurality of light emitting diodes 120 may be independently driven. The pixel circuit 130 and the panel driver 200 will be described in detail with reference to FIGS. 4 and 5.

The timing controller 300 may receive an image signal from the main controller 500 and generate a driving signal for controlling driving of the display panel 100 based on the image signal. The timing controller 300 may transmit a driving signal to the panel driver 200 of the display panel 100. The driving signal generated by the timing controller 300 may include a scan control signal for controlling an operation of the scan driver 210 and a data control signal for controlling an operation of the data driver 220. In one embodiment, the timing controller 300 may include a processor and a memory.

The sensor 410 may measure a current that is output from the timing controller 300 to the display panel 100. The sensor 410 may be included in the timing controller 300 or provided separately from the timing controller 300. The sensor 410 may transmit an electrical signal corresponding to the measured current value to the main controller 500. The main controller 500 may calculate power consumption of the display panel 100 based on the current value obtained by the sensor 410. The sensor 410 may include an ammeter, a wattmeter, and/or a voltmeter. A current output from the timing controller 300 to the display panel 100 may be measured using an external meter.

The communication circuitry 420 may communicate with an external device (e.g., a server, and a smart phone). The communication circuitry 420 may include a wireless communication circuit to which various wireless communication technologies are applied. The various communication technologies may be 3G communication, 4G communication, wireless Local Area Network (LAN), Wi-Fi, Bluetooth, Zigbee, Wi-Fi Direct (WFD), Ultra-Wide Band (UWB), infrared communication, Bluetooth Low Energy (BLE), Near Field Communication (NFC) and/or Z-Wave. In addition, the communication circuitry 420 may include a wired communication circuit to which a wired communication technology, such as Peripheral Component Interconnect (PCI), PCI-express, and/or Universe Serial Bus (USB), is applied.

The source receiver 430 may receive source data including video data and/or audio data from an external content source. For example, the source receiver 430 may include various types of terminals such as a component (YPbPr/RGB) terminal, a composite video blanking and sync (CVBS) terminal, an audio terminal, a High-Definition Multimedia Interface (HDMI) terminal, and a universal serial bus (USB) terminal. The source receiver 430 may transmit source data received from an external content source to the main controller 500. The main controller 500 may generate a video signal and/or an audio signal by processing the source data.

The input interface 440 may include various physical buttons and/or touch buttons provided on one region of the display apparatus 10. When the display panel 100 includes a touch screen panel, the display panel 100 may serve as the input interface 440. Further, the input interface 440 may be implemented as a remote controller. The input interface 440 may obtain a user input for controlling the display apparatus 10 such as power on, power off, volume control, channel control, screen control, and various setting changes of the display apparatus 10.

The main controller 500 may control the operation of electronic components included in the display apparatus 10. The main controller 500 may include a processor 510 and a memory 520. The processor 510 may generate an image signal, an audio signal, and/or a control signal for controlling the operation of the display apparatus 10 based on instructions, applications, data, and/or programs stored in the memory 520. Video signals and control signals generated by the main controller 500 may be output to the timing controller 300. The processor 510 is hardware and may include a logic circuit and an arithmetic circuit. The memory 520 and the processor 510 may be implemented as one control circuit or as a plurality of circuits.

The memory 520 may store various information necessary for the operation of the display apparatus 10. The memory 520 may store programs, data, instructions, software and/or applications for controlling the operation of the display apparatus 10. The memory 520 may include a volatile memory such as a static random access memory (S-RAM) or a dynamic random access memory (D-RAM) for temporarily storing data. In addition, the memory 520 may include a non-volatile memory such as a read only memory (ROM), an erasable programmable read only memory (EPROM), or an electrically erasable programmable read only memory (EEPROM) for long-term storage of data.

In addition to the components described in FIG. 3, the display apparatus 10 may further include various components. For example, the display apparatus 10 may further include a speaker configured to output sound.

The display apparatus 10 may perform a defect test to check whether or not the display apparatus 10 operates normally. For example, the defect test may be performed to check a connection state of the cable 20 connected to the display panel 100 and/or a screen state of the display panel 100. When the defect test is executed, the display apparatus 10 may detect the current applied to the display panel 100 while a pattern image is sequentially displayed on regions symmetrical to each other in the screen region S of the display panel 100.

Particularly, the main controller 500 may set a first region and a second region symmetrical to each other in the screen region S of the display panel 100. For example, the first region may be set in a left region and a second region may be set in a right region based on a center line formed when the display panel 100 is folded in half. The first region and the second region may be set in a rectangular shape or a square shape. The first region and the second region may be predetermined to be symmetrical to each other.

A size and position of the first region and the second region may be changed. The shape of the first region and the second region may also be changed. For example, the main controller 500 may set the size of each of the first region and the second region to a first size corresponding to half the size of the screen region S, or set the size of each of the first region and the second region to a second size less than the first size. The first region may be set to be located at an edge of the left region of the display panel 100, and the second region may be set to be located at an edge of the right region of the display panel 100. The size and shape of the first region and the second region may be set to be the same. Accordingly, the first region and the second region may be symmetrical to each other.

The main controller 500 may transmit a pattern image signal to the timing controller 300 to sequentially display pattern images in the first region of the display panel 100 and in the second region symmetrical to the first region. The timing controller 300 may generate a driving signal to allow the display panel 100 to display a pattern image in response to receiving the pattern image signal. Accordingly, the pattern image may be sequentially displayed on the first region and the second region of the display panel 100.

The pattern image may be provided in various colors. For example, the main controller 500 may transmit a first pattern image signal corresponding to a white pattern image or a second pattern image signal corresponding to a yellow pattern image to the timing controller 300. The color of the pattern image is not limited thereto. The color of the pattern image may be provided in red, green or blue.

The main controller 500 may obtain a first current value output from the timing controller 300 based on the pattern image displayed in the first region of the display panel 100. Further, the main controller 500 may obtain a second current value output from the timing controller 300 based on the pattern image displayed in the second region of the display panel 100. The first current value and the second current value may be obtained from the sensor 410 provided on the control board 50 or may be obtained using an external meter.

The main controller 500 may determine the connection state of the cable 20 connected to the display panel 100 based on the first current value and the second current value. For example, the main controller 500 may detect a connection defect of the cable 20 based on a difference between the first current value and the second current value. In one embodiment, the difference may be greater than or equal to a predetermined threshold value. In addition, the main controller 500 may detect the connection defect of the cable 20 based on a difference between the first current value or the second current value and a reference current value. In one embodiment, the difference is greater than or equal to a predetermined threshold value.

Although the main controller 500 transmits the pattern image signal for outputting the same pattern image on the first and second regions that are symmetrical to each other, a difference may occur in the values of the current applied to the display panel 100, which may be determined that the connection defect of the cable 20 is present. In addition, the main controller 500 may detect a screen defect of the display panel 100 as well as the connection defect of the cable 20.

A current output from the timing controller 300 to the display panel 100 is different according to the color of the pattern image. For example, power consumed by the display panel 100 to display a white pattern image is different from power consumed by the display panel 100 to display a yellow pattern image.

The main controller 500 may repeatedly determine the connection state of the cable 20 by changing the color of the pattern image. For example, the main controller 500 may determine the connection state of the cable 20 while sequentially displaying a white pattern image in the first region and the second region. Thereafter, the main controller 500 may determine the connection state of the cable 20 while sequentially displaying a yellow pattern image in the first region and the second region. The disclosed display apparatus 10 may more accurately detect the connection defect of the cable 20 by changing the color of the pattern image, and repeatedly measuring the current output from the timing controller 300.

As described above, the display panel 100 includes the plurality of light emitting diodes 120 independently driven. According to a position where an image is displayed within the screen region S of the display panel 100, a driving signal transmitted to the display panel 100 may vary, and whether or not each of the light emitting diodes 120 is driven may vary. That is, the power consumed by the display panel 100 may vary according to the position where the image is displayed within the screen region S.

The main controller 500 may repeatedly determine the connection state of the cable 20 by changing the size and position of the first region and the second region within the screen region S of the display panel 100. For example, the main controller 500 may sequentially display the pattern image in the first region located at the upper left corner of the display panel 100 and in the second region located at the upper right corner of the display panel 100. The main controller 500 may determine the connection state of the cable 20 based on the current output from the timing controller 300 based on the pattern image displayed. Thereafter, the main controller 500 may change and set the position of the first region to the center of the left region of the display panel 100 and change and set the position of the second region to the center of the right region of the display panel 100. Along with the position change of the first region and the second region, the size and shape of the first region and the second region may also be changed. The main controller 500 may determine the connection state of the cable 20 while sequentially displaying pattern images in the changed first region and the changed second region.

The disclosed display apparatus 10 may change the size and position of the first region and the second region where the pattern image is displayed, and repeatedly check the current output from the timing controller 300, thereby more accurately and effectively detecting the connection defect of the cable 20. In addition, the display apparatus 10 may easily detect which part of the screen region S of the display panel 100 has a screen defect.

The display apparatus 10 may provide information on a defect test result to a user. For example, the display apparatus 10 may display connection state information of the cable 20. The main controller 500 may transmit an image signal including connection state information of the cable 20 to the timing controller 300. Accordingly, the connection state information of the cable 20 may be displayed on the screen region S of the display panel 100. In addition, in order to prevent damage to the display panel 100, the main controller 500 may cut off power supply to the display panel 100 based on the detection of the connection defect of the cable 20. Cutting off power supply to the display panel 100 may be performed after the connection state information of the cable 20 is provided.

Figure 4:
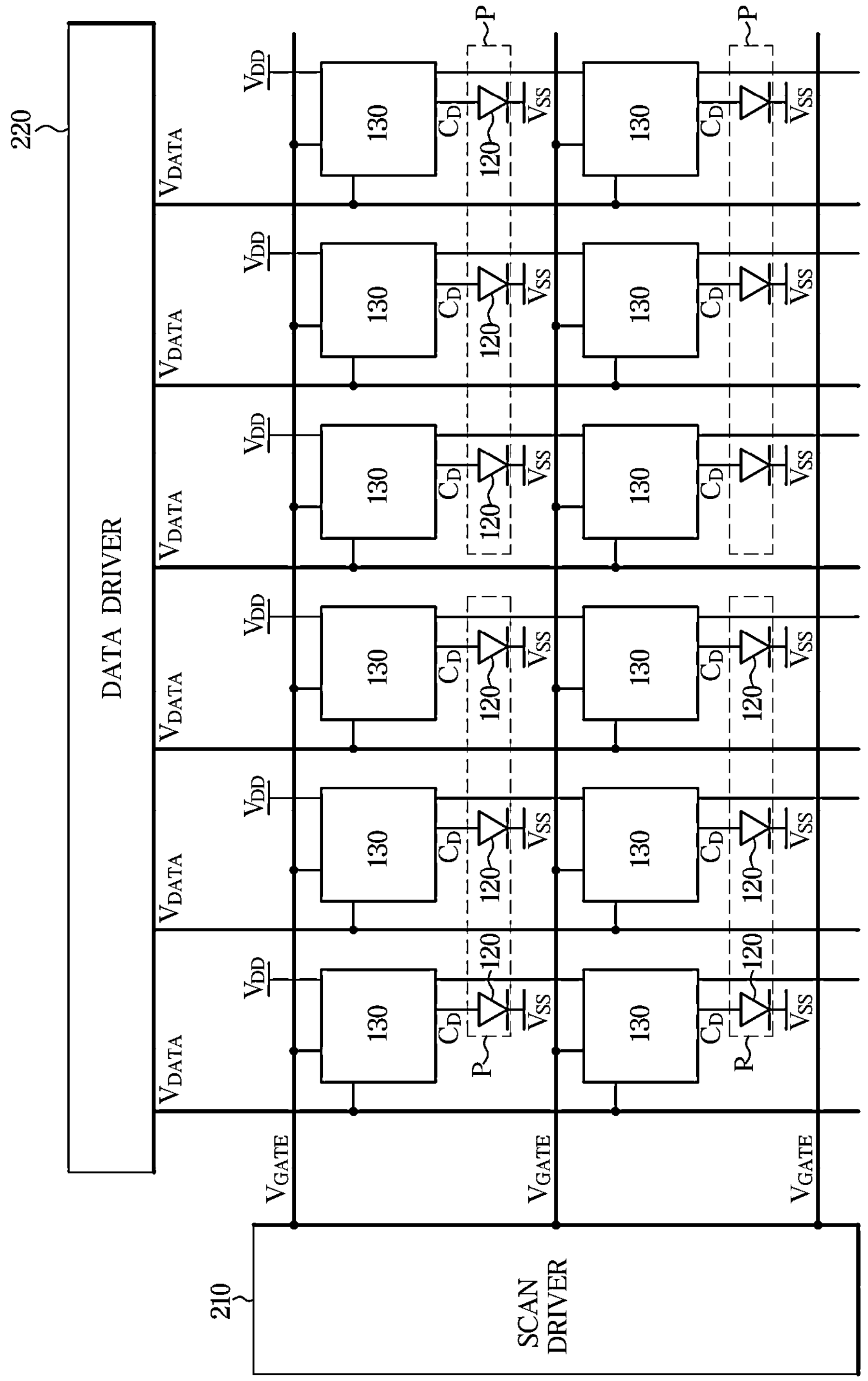
FIG. 4 illustrates a driving circuit for driving pixels of a display panel according to an embodiment.
Figure 5:
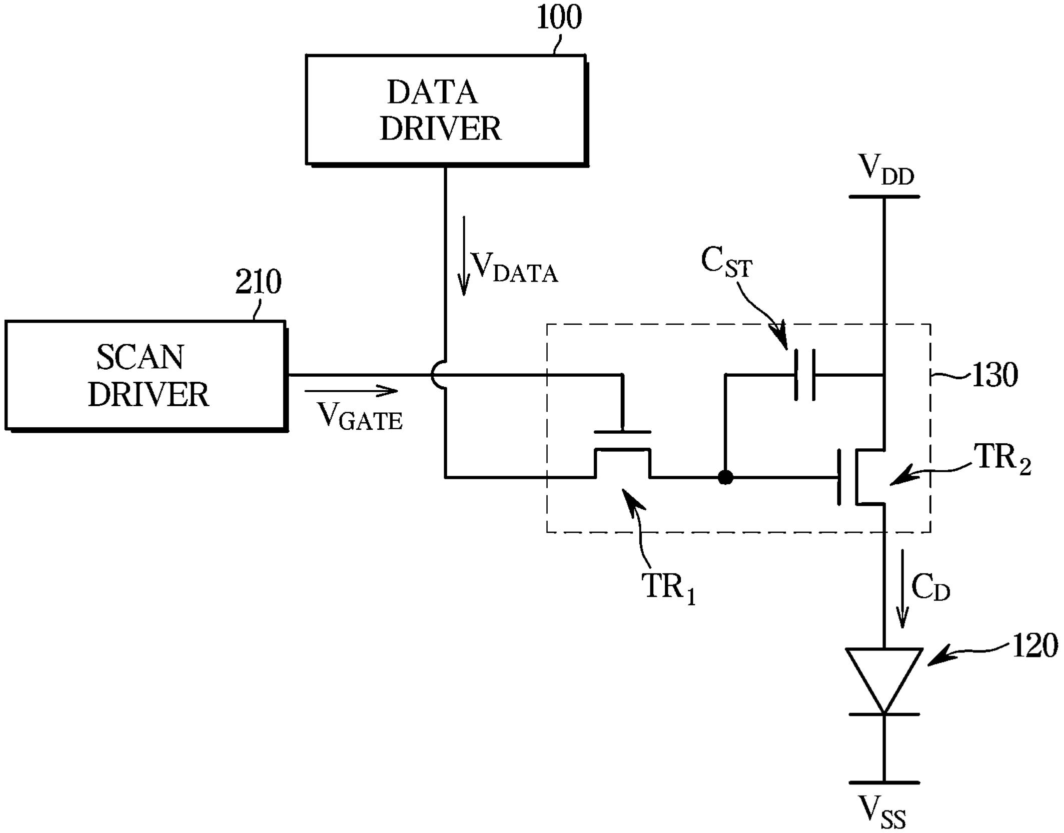
FIG. 5 illustrates a configuration of a pixel circuit shown in FIG. 4.

FIG. 4 illustrates a driving circuit for driving pixels of a display panel according to an embodiment. FIG. 5 illustrates a configuration of a pixel circuit shown in FIG. 4.

Referring to FIGS. 4 and 5, the panel driver 200 may include the scan driver 210 and the data driver 220. The scan driver 210 may output a gate signal for turning on or off the sub-pixel, and the data driver 220 may output a data signal for implementing an image. That is, the panel driver 200 may generate a gate signal and a data signal based on a driving signal transmitted from the timing controller 300. The panel driver 200 may be implemented as a display driver integrated circuit (DDIC).

The scan driver 210 may output a gate voltage $V_{GATE}$ based on the scan control signal transmitted from the timing controller 300, and the data driver 220 may output a data voltage $V_{DATA}$ based on the data control signal transmitted from the timing controller 300. The gate voltage $V_{GATE}$ output from the scan driver 210 and the data voltage $V_{DATA}$ output from the data driver 220 may be input to the pixel circuit 130. When the gate voltage $V_{GATE}$, the data voltage $V_{DATA}$, and a power supply voltage $V_{DD}$ are applied to the pixel circuit 130, the pixel circuit 130 may output a driving current $C_D$ for driving the light emitting diode 120. The driving current $C_D$ output from the pixel circuit 130 may be input to the light emitting diode 120, and the light emitting diode 120 may emit light by the input driving current $C_D$. Accordingly, an image may be displayed on the screen region S of the display panel 100.

The pixel circuit 130 may include a switching transistor $TR_1$, a driving transistor $TR_2$, and a capacitor $C_{st}$. The light emitting diode 120 may be an organic light emitting diode. The switching transistor $TR_2$ and the driving transistor $TR_2$ may be provided as p-channel metal-oxide semiconductor (PMOS) type transistors, but are not limited thereto. Alternatively, the switching transistor $TR_1$ and the driving transistor $TR_2$ may also be provided with n-channel metal-oxide semiconductor (NMOS) type transistors.

A gate electrode of the switching transistor $TR_1$ is connected to the scan driver 210, a source electrode is connected to the data driver 220, and a drain electrode is connected to one end of the capacitor $C_{st}$ and a gate electrode of the driving transistor $TR_2$. A power supply voltage $V_{DD}$ may be applied to the other terminal of the capacitor $C_{st}$.

The power supply voltage $V_{DD}$ is supplied to the source electrode of the driving transistor $TR_2$, and the drain electrode of the driving transistor $TR_2$ is connected to an anode of the light emitting diode 120. A reference voltage $V_{SS}$ may be supplied to a cathode of the light emitting diode 120. The reference voltage $V_{SS}$ corresponding to a voltage at a lower level than the power supply voltage $V_{DD}$ may be a ground voltage, and provide a ground.

The pixel circuit 130 may operate as follows. First, when the switching transistor $TR_1$ is turned on by the gate voltage $V_{GATE}$ applied from the scan driver 210, the data voltage $V_{DATA}$ applied from the data driver 220 may be transferred to one end of the capacitor $C_{st}$ and the gate electrode of the driving transistor $TR_2$. A voltage corresponding to a gate-source voltage $V_{GS}$ of the driving transistor $TR_2$ may be maintained for a predetermined time by the capacitor $C_{st}$. The driving transistor $TR_2$ may allow the light emitting diode 120 to emit light by applying a driving current $C_D$ corresponding to the gate-source voltage $V_{GS}$ to the anode of the light emitting diode 120.

At this time, when a high data voltage $V_{DATA}$ is transmitted to the gate electrode of the driving transistor $TR_2$, the gate-source voltage $V_{GS}$ of the driving transistor $TR_2$ may be reduced and a small amount of the driving current $C_D$ may be applied to the light emitting diode 120. Accordingly, the light emitting diode 120 may display a low grayscale. On the other hand, when a low data voltage $V_{DATA}$ is transmitted, the gate-source voltage $V_{GS}$ of the driving transistor $TR_2$ may be increased, and a large amount of driving current $C_D$ may be applied to the light emitting diode 120. Accordingly, the light emitting diode 120 may display a high grayscale.

The structure of the pixel circuit 130 described above is merely an example. Various circuit structures for switching and driving the plurality of light emitting diodes 120 may be applied to the disclosed display apparatus 10 in addition to the above examples.

In addition, the brightness control of the light emitting diode 120 may be performed by various methods. For example, in order to control the brightness of the light emitting diode 120, a pulse amplitude modulation (PAM) method, a pulse width modulation (PWM) method, or a hybrid method combining a PAM method and a PWM method may be used.

Figure 6:
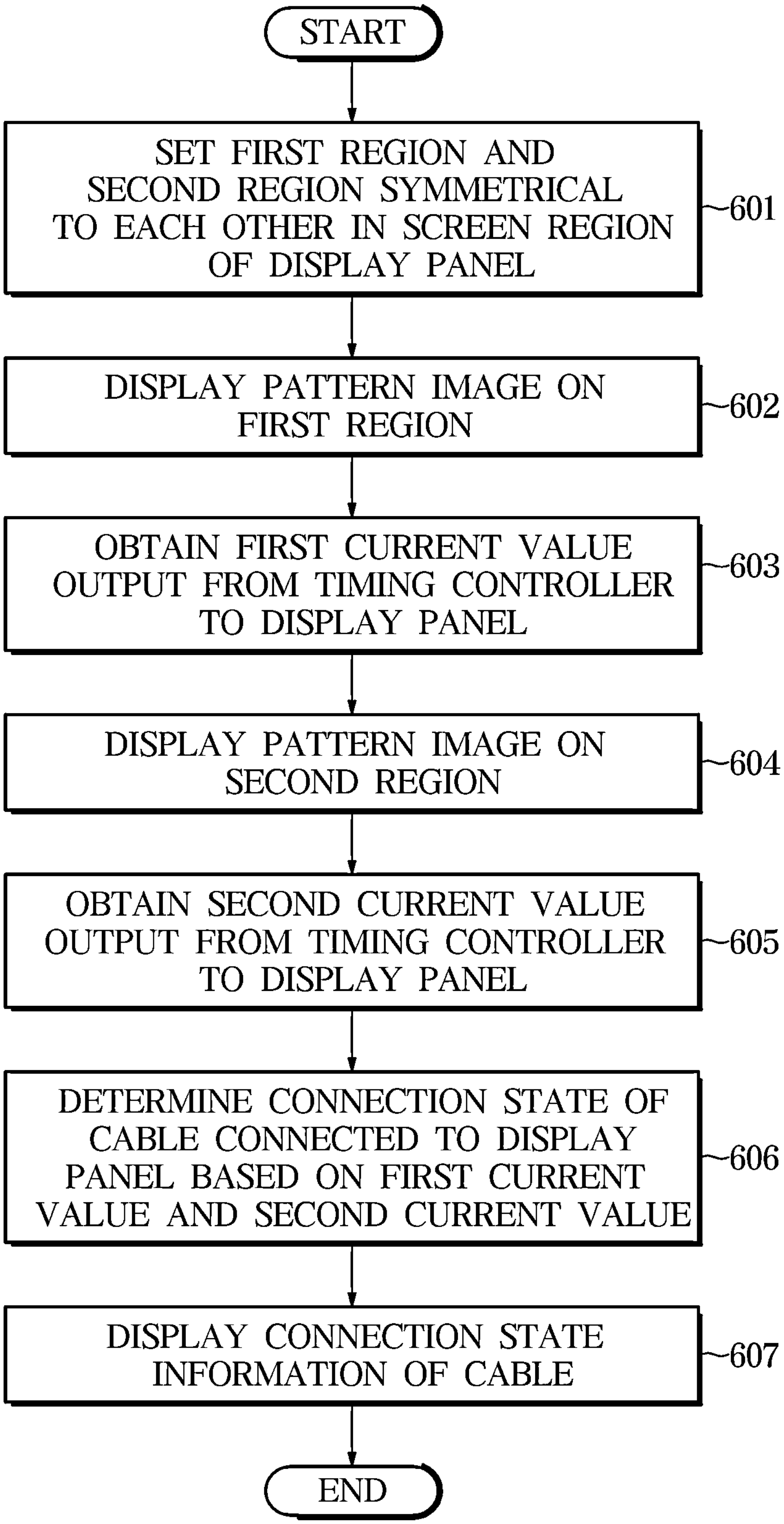
FIG. 6 illustrates a control method of the display apparatus according to an embodiment.

FIG. 6 is a flowchart illustrating a control method of the display apparatus according to an embodiment.

Referring to FIG. 6, the main controller 500 of the disclosed display apparatus 10 may set the first region and the second region that is symmetrical to each other in the screen region S of the display panel 100 (601). For example, the first region may be a left region and the second region may be a right region based on a center line formed when the display panel 100 is folded in half. In one embodiment, the first region and the second region may be set in a rectangular shape or a square shape. The first region and the second region may be determined as the display apparatus 10 enters the defect test mode.

In addition, the main controller 500 may transmit the pattern image signal to the timing controller 300 to sequentially display pattern images in the first region of the display panel 100 and in the second region symmetrical to the first region. The timing controller 300 may generate the driving signal to allow the display panel 100 to display the pattern image in response to receiving the pattern image signal.

The display panel 100 may display the pattern image on the first region within the screen region S based on the driving signal transmitted from the timing controller 300 (602). The main controller 500 may obtain a first current value output from the timing controller 300 based on the pattern image displayed in the first region of the display panel 100 (603).

Thereafter, the display panel 100 may display the pattern image on the second region within the screen region S based on the driving signal transmitted from the timing controller 300 (604). The main controller 500 may obtain a second current value output from the timing controller 300 based on the pattern image displayed in the second region of the display panel 100 (605).

The main controller 500 may determine the connection state of the cable 20 connected to the display panel 100 based on the first current value and the second current value (606). For example, the main controller 500 may detect the connection defect of the cable 20 based on a difference between the first current value and the second current value. In one embodiment, the difference is greater than or equal to a predetermined threshold value. In addition, the main controller 500 may detect a connection defect of the cable 20 based on a difference between the first current value and the reference current value or the second current value and the reference current value. In one embodiment, the difference may be greater than or equal to a predetermined threshold value.

The main controller 500 may repeatedly determine the connection state of the cable 20 by changing the color of the pattern image. In addition, the main controller 500 may repeatedly determine the connection state of the cable 20 by changing the size and position of the first region and the second region within the screen region S of the display panel 100. The shapes of the first region and the second region may also be changed.

The display apparatus 10 may provide information on a defect test result to a user. That is, the display apparatus 10 may display connection state information of the cable 20 (607). Accordingly, a user can easily determine the connection defect of the cable 20. In addition, a user can easily check which part of the screen region S of the display panel 100 has a screen defect based on the pattern image displayed on the display panel 100.

Additionally, in order to prevent damage to the display panel 100, the main controller 500 may cut off power supply to the display panel 100 based on the detection of the connection defect of the cable 20. Cutting off power supply to the display panel 100 may be performed after the connection state information of the cable 20 is provided.

Figure 7:
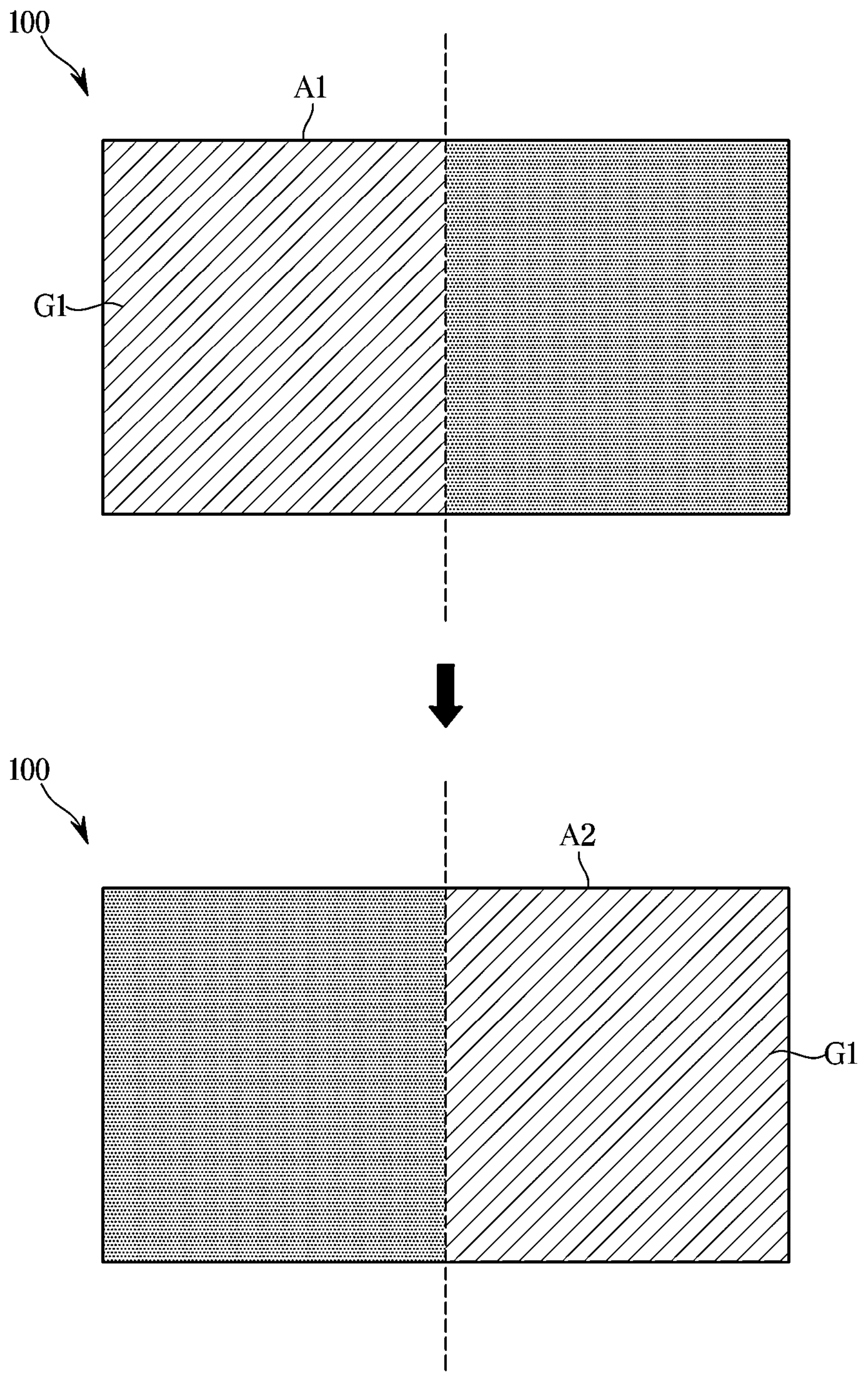
FIG. 7 illustrates an example of sequentially displaying pattern images in a first region and a second region set within a screen region of the display panel.
Figure 8:
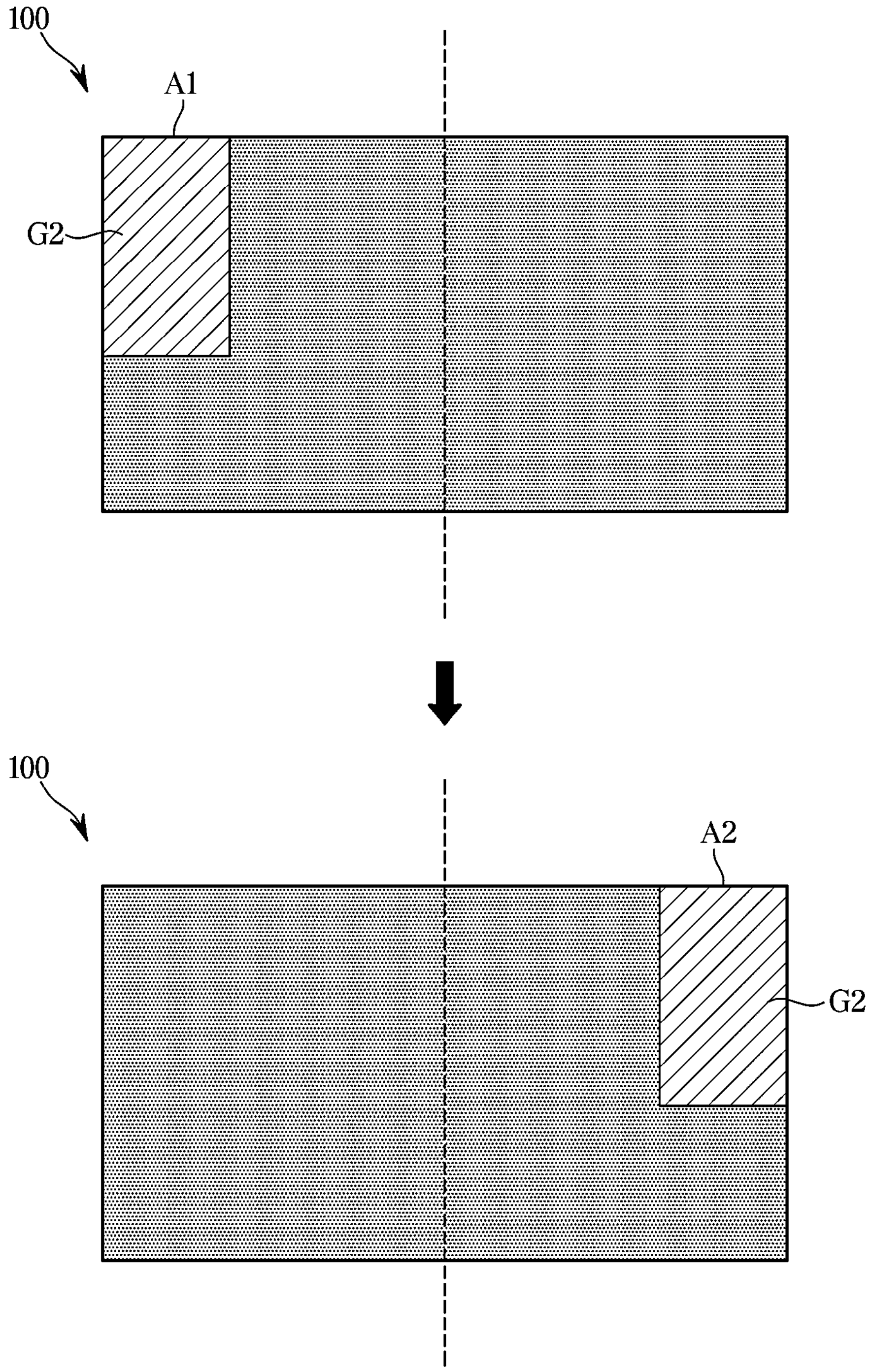
FIG. 8 illustrates another example of sequentially displaying pattern images in a first region and a second region set within the screen region of the display panel.
Figure 9:
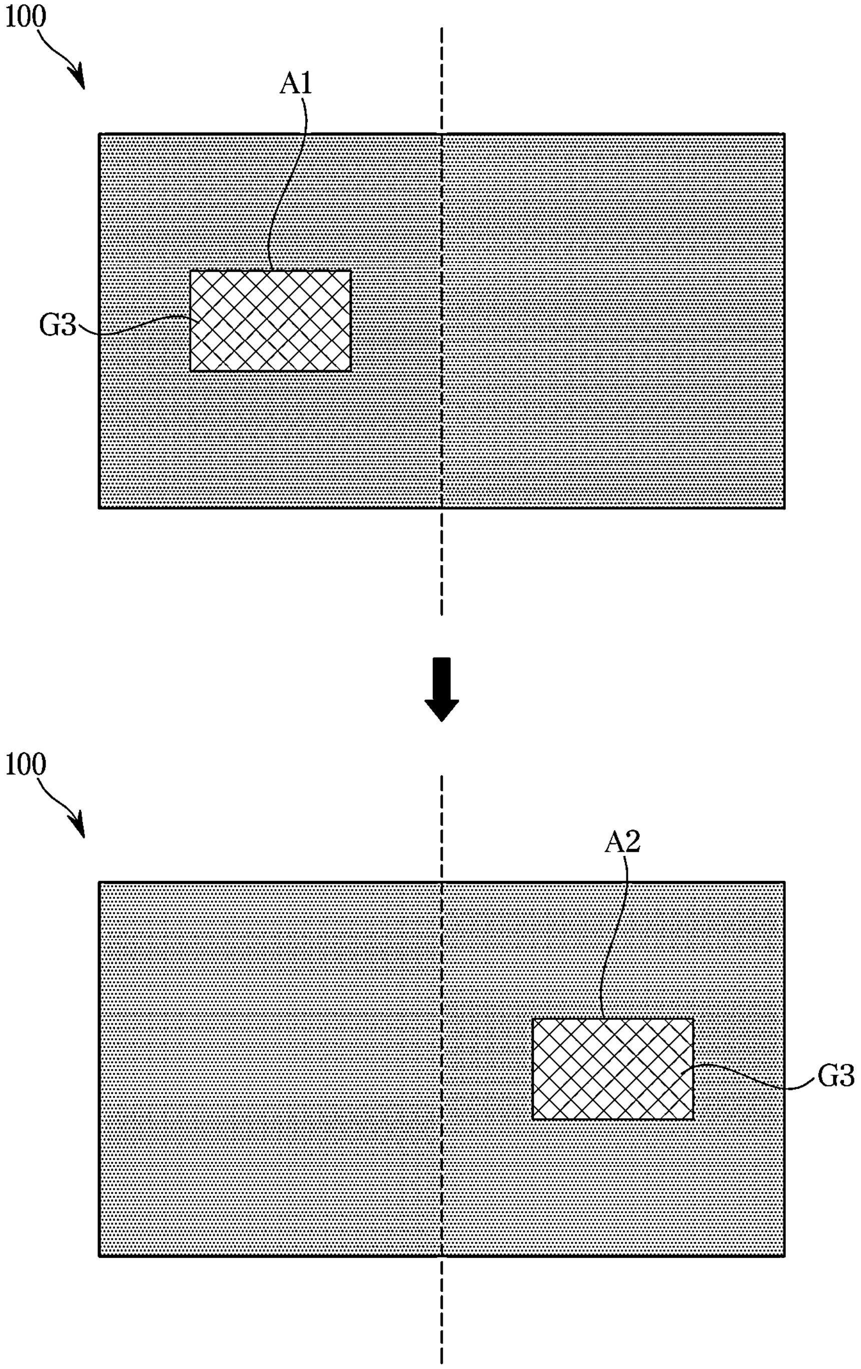
FIG. 9 illustrates another example of sequentially displaying pattern images in a first region and a second region set within the screen region of the display panel.

FIG. 7 illustrates an example of sequentially displaying pattern images in a first region and a second region set within a screen region of the display panel. FIG. 8 illustrates another example of sequentially displaying pattern images in a first region and a second region set within the screen region of the display panel. FIG. 9 illustrates yet another example of sequentially displaying pattern images in a first region and a second region set within the screen region of the display panel.

The main controller 500 of the display apparatus 10 may set the first region and the second region symmetrical to each other in the screen region S of the display panel 100. For example, the first region A1 may be set in the left region and the second region A2 may be set in the right region based on a center line formed when the display panel 100 is folded in half. The first region A1 and the second region A2 may be set in a rectangular shape or a square shape. The shapes of the first region A1 and the second region A2 are not limited thereto.

The size of the first region A1 and the second region A2 may be set in various ways. As shown in FIG. 7, the size of each of the first region A1 and the second region A2 may be set to a first size corresponding to half the size of the screen region S of the display panel 100. A first pattern image G1 may be sequentially displayed in the first region A1 and the second region A2. That is, the first pattern image G1 may be displayed on the right half after being displayed on the left half of the display panel 100. The first pattern image G1 may be first displayed in the second region A2 and then displayed in the first region A1. While the first pattern image G1 is displayed in the first region A1, the light emitting diodes 120 belonging to the second region A2 may not be driven. While the first pattern image G1 is displayed in the second region A2, the light emitting diodes 120 belonging to the first region A1 may not be driven.

The main controller 500 may compare a first current, which is applied to the display panel 100 while the first pattern image G1 is displayed on the left half of the display panel 100, with a second current, which is applied to the display panel 100 while the first pattern image G1 is displayed on the right half of the display panel 100. When the difference, which is between the first current and the second current, is greater than or equal to the threshold value, it may be determined that the connection defect of the cable 20 is present. Further, when the difference, which is between each of the first current or the second current and the reference value, is greater than or equal to the threshold value, it may be determined that the connection defect of the cable 20 is present.

As shown in FIGS. 8 and 9, the size of each of the first region A1 and the second region A2 may be set to the second size less than half the size of the screen region S. However, in order to allow the first region A1 and the second region A2 to be symmetrical to each other, the size and shape of the first region A1 and the second region A2 may be set to be the same.

Further, the position of the first region A1 and the second region A2 may be set in various ways. For example, as shown in FIG. 8, the first region A1 may be set to be located at the edge of the left region of the display panel 100, and the second region A2 may be located on the edge of the right region the display panel 100. As shown in FIG. 9, the first region A1 may be set to be located at the center of the left region of the display panel 100, and the second region A2 may be located at the center of the right region of the display panel 100.

A second pattern image G2 may be displayed in the first region A1 and the second region A2 of FIG. 8. A third pattern image G3 may be displayed in the first region A1 and the second region A2 of FIG. 9. That is, the sizes and positions of the regions where the first pattern image G1, the second pattern image G2, and the third pattern image G3 are displayed may be different. The colors of the first pattern image G1, the second pattern image G2, and the third pattern image G3 may be the same as each other or different from each other.

As described above, the display apparatus 10 may repeatedly determine the connection state of the cable 20 by changing the size and position of the first region A1 and the second region A2 within the screen region S of the display panel 100. In addition, the display apparatus 10 may repeatedly determine the connection state of the cable 20 by changing the color of the pattern image. For example, the display apparatus 10 may repeatedly determine the connection state of the cable 20 by displaying at least one of the first pattern image G1, the second pattern image G2, and the third pattern image G3 one or more times. Accordingly, it is possible to more accurately and effectively detect the connection defect of the cable 20. Further, it is possible to easily detect which part of the screen region S of the display panel 100 has a screen defect.

FIG. 10 illustrates an example in which cable connection state information is displayed on the screen region of the display panel.

Referring to FIG. 10, the display apparatus 10 may provide information on a defect test result to a user. For example, the display apparatus 10 may display connection state information of the cable 20. The connection state information of the cable 20 may be displayed as a table 1000. The table 1000 including connection state information of the cable 20 may include information on the power consumed by the display panel 100 and the difference between the measured power consumption values in correspondence to the types of pattern images displayed in the first region A1 and the second region A2 of the display panel 100 and the display of each pattern image. Further, the table 1000 may indicate whether the cable connection state is normal or defective. Accordingly, a user can easily determine the connection defect of the cable 20.

The main controller 500 of the display apparatus 10 may record the power consumption values obtained in correspondence to each pattern image displayed in the first region A1 and the second region A2 of the display panel 100. For example, the main controller 500 may record a power consumption value of the display panel 100, which is obtained as the first pattern image G1 is displayed in the first region A1, as a first region measurement value, and record a power consumption value of the display panel 100, which is obtained as the first pattern image G1 is displayed in the second region A2, as a second region measurement value. In addition, the main controller 500 may record a power consumption value of the display panel 100 obtained as the first pattern image G1 is sequentially displayed in the first region A1 and the second region A2.

The main controller 500 may determine the cable connection state using the obtained power consumption values, and may generate the table 1000 representing the determination result. The main controller 500 may transmit an image signal corresponding to the table 1000 to the timing controller 300. Accordingly, the connection state information of the cable 20 may be displayed on the screen region of the display panel 100.

As is apparent from the above description, a display apparatus and a control method thereof may effectively detect a connection defect of a cable connected to a self-luminous display panel. Further, it is possible to effectively detect a screen defect of the self-luminous display panel.

The disclosed embodiments may be embodied in the form of a recording medium storing instructions executable by a computer. The instructions may be stored in the form of program code and, when executed by a processor, may generate a program module to perform the operations of the disclosed embodiments.

Storage medium readable by machine, may be provided in the form of a non-transitory storage medium. "Non-transitory" means that the storage medium is a tangible device and does not contain a signal (e.g., electromagnetic wave), and this term includes a case in which data is semi-permanently stored in a storage medium and a case in which data is temporarily stored in a storage medium.

The method according to the various disclosed embodiments may be provided by being included in a computer program product. Computer program products may be traded between sellers and buyers as commodities. Computer program products are distributed in the form of a device-readable storage medium (e.g., compact disc read only memory (CD-ROM)), or are distributed directly or online (e.g., downloaded or uploaded) between two user devices (e.g., smartphones) through an application store (e.g., Play Store™). In the case of online distribution, at least a portion of the computer program product (e.g., downloadable app) may be temporarily stored or created temporarily in a device-readable storage medium such as the manufacturer's server, the application store's server, or the relay server's memory.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:

a display panel comprising a first region and a second region symmetrical to the first region;

a main controller configured to process source data and to generate an image signal;

a timing controller configured to generate a driving signal for driving the display panel based on the image signal; and a cable connected to the display panel and configured to transmit the driving signal to the display panel, wherein the main controller is configured to:

transmit, to the timing controller, a pattern image signal for displaying a pattern image on the first region and the second region in a sequential manner; and determine a connection state of the cable based on (i) a first current value, which is output from the timing controller based on the pattern image displayed in the first region and (ii) a second current value, which is output from the timing controller based on the pattern image displayed in the second region.

2. The display apparatus of claim 1, wherein the main controller is further configured to detect a connection defect of the cable based on a difference between the first current value and the second current value, and wherein the difference is greater than or equal to a predetermined threshold value.

3. The display apparatus of claim 1, wherein the main controller is further configured to detect a connection defect of the cable based on a difference between the first current value and a reference current value or the second current value and the reference current value, wherein the difference is greater than or equal to a predetermined threshold value.

4. The display apparatus of claim 1, wherein the main controller is further configured to determine the connection state of the cable by changing a color of the pattern image.

5. The display apparatus of claim 1, wherein the main controller is further configured to transmit a first pattern image signal corresponding to a white pattern image or to transmit a second pattern image signal corresponding to a yellow pattern image.

6. The display apparatus of claim 1, wherein the main controller is further configured to determine the connection state of the cable by changing a size and a position of the first region or the second region.

7. The display apparatus of claim 1, wherein the main controller is further configured to:

set a size of the first region or the second region to a first size corresponding to half a size of a screen region of the display panel; or set the size of the first region or the second region to a second size less than the first size.

8. The display apparatus of claim 1, wherein the timing controller comprises a sensor configured to measure a current output to the display panel.

9. The display apparatus of claim 1, wherein the main controller is further configured to transmit an image signal comprising connection state information to the timing controller and configured to display the connection state information on the display panel.

10. The display apparatus of claim 1, wherein the main controller is further configured to cut off power supply to the display panel by detecting a connection defect of the cable.

11. A control method of a display apparatus comprising a display panel and a main controller, the control method comprising:

transmitting, by the main controller, a pattern image signal for displaying a pattern image on a first region and a second region symmetrical to the first region of the display panel in a sequential manner, to a timing controller;

obtaining a first current value output from the timing controller to the display panel based on the pattern image displayed in the first region;

obtaining a second current value output from the timing controller to the display panel based on the pattern image displayed in the second region; and determining a connection state of a cable, which is connected to the display panel, based on the first current value and the second current value.

12. The control method of the display apparatus of claim 11, wherein the determining of the connection state of the cable comprises detecting a connection defect of the cable based on a difference between the first current value and the second current value, and wherein the difference is greater than or equal to a predetermined threshold value.

13. The control method of the display apparatus of claim 11, wherein the determining of the connection state of the cable comprises detecting a connection defect of the cable based on a difference between the first current value and a reference current value or the second current value and the reference current value, and wherein the difference is greater than or equal to a predetermined threshold value.

14. The control method of the display apparatus of claim 11, wherein the determining of the connection state of the cable is performed by changing a color of the pattern image.

15. The control method of the display apparatus of claim 11, wherein the pattern image signal comprises a first pattern image signal corresponding to a white pattern image or a second pattern image signal corresponding to a yellow pattern image.

16. The control method of the display apparatus of claim 11, wherein the determining of the connection state of the cable is performed by changing a size and position of each of the first region and the second region.

17. The control method of the display apparatus of claim 11, wherein a size of the first region or the second region is set to a first size corresponding to half a size of a screen region of the display panel; or the size of the first region or the second region is set to a second size less than the first size.

18. The control method of the display apparatus of claim 11, wherein the first current value and the second current value are obtained from a sensor; and wherein the timing controller comprises the sensor.

19. The control method of the display apparatus of claim 11, further comprising:

transmitting, by the main controller, an image signal comprising connection state information to the timing controller, and displaying the connection state information of the cable on the display panel.

20. The control method of the display apparatus of claim 11, further comprising cutting off, by the main controller, power supply to the display panel, by detecting a connection defect of the cable.

* * * * *